United States Patent
Jackson et al.

(10) Patent No.: US 9,501,044 B2
(45) Date of Patent: Nov. 22, 2016

(54) FITNESS WATCH CASE

(71) Applicant: TomTom International B.V., Amsterdam (NL)

(72) Inventors: Stephen Michael Jackson, London (GB); Mark Gretton, London (GB); Martin Riddiford, London (GB); Anthony Nicholas Pond, San Francisco, CA (US); Liam James O'Brien, London (GB)

(73) Assignee: TomTom International B.V., Amsterdam (NL)

( * ) Notice: Subject to any disclaimer, the term of this patent is extended or adjusted under 35 U.S.C. 154(b) by 0 days.

(21) Appl. No.: 14/773,445

(22) PCT Filed: Mar. 10, 2014

(86) PCT No.: PCT/EP2014/054611
§ 371 (c)(1),
(2) Date: Sep. 8, 2015

(87) PCT Pub. No.: WO2014/135709
PCT Pub. Date: Sep. 12, 2014

(65) Prior Publication Data
US 2016/0026156 A1 Jan. 28, 2016

(30) Foreign Application Priority Data

Mar. 8, 2013 (GB) .................... 1304220.5

(51) Int. Cl.
*G04G 21/04* (2013.01)
*G04G 17/08* (2006.01)
(Continued)

(52) U.S. Cl.
CPC ........... *G04G 17/08* (2013.01); *G04B 37/0058* (2013.01); *G04G 9/007* (2013.01);
(Continued)

(58) Field of Classification Search
CPC ...... G04G 21/04; G04G 21/08; G04G 9/007; G04G 17/08; G04R 60/00; G06F 1/1692; G04B 37/0058
USPC .................................................. 368/281–283
See application file for complete search history.

(56) References Cited

U.S. PATENT DOCUMENTS 4,184,321 A * 1/1980 Tarusawa ............... G04G 9/007
200/302.2
4,412,751 A * 11/1983 Jeannet ............... G04G 17/083
368/204
(Continued)

FOREIGN PATENT DOCUMENTS

DE 20001839 U1 10/2000
EP 0195435 A2 9/1986
(Continued)

OTHER PUBLICATIONS

Camber—dictionary.com—Feb. 20, 2016.*
(Continued)

*Primary Examiner* — Sean Kayes

(57) ABSTRACT

A fitness watch case (502) is disclosed comprising a display housing (504) that houses a display for displaying information to a user; and a user interface (506) having touch-sensitive input means for controlling the watch. The user interface (506) is spaced apart from the display housing (504), thereby enabling the user to operate the user interface using only a single finger. The watch case (502) is insertable into a strap (508) to form a fitness watch (500) that can be worn on the wrist of the user.

20 Claims, 9 Drawing Sheets

(51) Int. Cl.
*G04G 9/00* (2006.01)
*G04B 37/00* (2006.01)
*G04G 21/08* (2010.01)
*G04R 60/00* (2013.01)
*G06F 1/16* (2006.01)
*G06F 3/0481* (2013.01)
*G06F 3/0482* (2013.01)

(52) U.S. Cl.
CPC ............ *G04G 21/04* (2013.01); *G04G 21/08* (2013.01); *G04R 60/00* (2013.01); *G06F 1/163* (2013.01); *G06F 1/169* (2013.01); *G06F 1/1692* (2013.01); *G06F 3/0482* (2013.01); *G06F 3/04817* (2013.01)

(56) References Cited

U.S. PATENT DOCUMENTS

| | | | |
|---|---|---|---|
| 4,444,513 A * | 4/1984 | Proellochs | G04B 37/0427 368/223 |
| 4,817,065 A | 3/1989 | Usui et al. | |
| 6,158,884 A * | 12/2000 | Lebby | G04B 47/00 224/165 |
| 6,590,835 B2 * | 7/2003 | Farine | G04G 17/083 368/10 |
| 6,619,835 B2 * | 9/2003 | Kita | A44C 5/0015 368/10 |
| 8,059,491 B1 * | 11/2011 | Hennings-Kampa | G04G 9/0064 368/14 |
| 8,260,384 B2 | 9/2012 | Wulff et al. | |
| 2002/0012292 A1 * | 1/2002 | Mitamura | A44C 5/0015 368/281 |
| 2003/0197678 A1 * | 10/2003 | Siddeeq | G06F 1/163 345/156 |
| 2004/0145975 A1 * | 7/2004 | Barras | G04G 21/04 368/281 |
| 2008/0054039 A1 | 3/2008 | Wulff et al. | |

FOREIGN PATENT DOCUMENTS

| | | |
|---|---|---|
| EP | 1809130 A1 | 7/2007 |
| EP | 2059863 A2 | 5/2009 |
| GB | 2161000 A | 1/1986 |
| GB | 2388765 A | 11/2003 |
| WO | 2008035993 A1 | 3/2008 |
| WO | 2009032375 A1 | 3/2009 |
| WO | 2010126825 A1 | 11/2010 |
| WO | 2012045483 A1 | 4/2012 |
| WO | 2012061438 A2 | 5/2012 |

OTHER PUBLICATIONS

International Search Report for PCT/EP2014/054611 published as WO2014135709 A3 dated Nov. 20, 2014.
UKIPO Search Report for United Kingdom application No. GB1304220.5 dated Jul. 15, 2015.

* cited by examiner

550

FITNESS WATCH CASE

CROSS-REFERENCES TO RELATED APPLICATIONS

This application is the National Stage of International Application No. PCT/EP2014/054611, filed Mar. 10, 2014, and designating the United States, which claims benefit to United Kingdom Patent Application No. 1304220.5 filed Mar. 8, 2013. The entire content of these applications is incorporated herein by reference.

FIELD OF THE INVENTION

This invention relates to fitness watches, and more specifically to the casing of a fitness watch, which in preferred embodiments is formed as module that can be removable attached to a number of different docking solutions. Illustrative embodiments of the invention relate to devices for monitoring athletic performance, e.g. that can be worn by runners, cyclists, etc, which can track and record the pace of the user at particular moments during a workout and/or the distance covered by the user during the workout.

BACKGROUND OF THE INVENTION

In recent years GPS devices have started to be used for pedestrian and outdoor applications. For example, fitness watches that include GPS receivers have started to be used by joggers, runners, cyclists and other athletes and outdoor enthusiasts as a means to obtain real-time data of their speed, distance travelled, etc. An example of such a fitness watch is shown in FIG. 1; the appearance of which is shown, for example, in U.S. Pat. No. D637,918 S, and the associated functionality being described in more detail in WO 2012/045483 A1. The fitness watch has a housing 20 in which is contained various electronic components, including a processor connected to a display screen 22, such as an LCD display, and an input device in the form of 3 push buttons 28 on the side of the display screen. The processor is connected to a global navigation satellite system (GNSS) receiver, such as a GPS and/or GLONASS receiver, having an antenna, e.g. in the form of a patch antenna, for use in determining the location and movements of the user of the watch. The watch may also comprise a wireless communications device for receiving data from other sensors, such as a foot pod sensor or a heart rate sensor. The watch further includes an input/output (I/O) device, in this case a USB connector which is located at the end of the strap 24 of the watch under a hinged cover 26, for transferring data to and from the watch and for providing power to recharge the battery of the watch.

It is desired, in at least embodiments of the present invention, to provide an improved fitness watch.

SUMMARY OF THE INVENTION

The present invention provides a fitness watch case comprising: a display housing that houses a display for displaying information to a user; and a user interface having input means for controlling the watch; wherein the user interface is spaced apart from the display housing.

According to the present invention, the user interface is not located on the housing portion of the watch that contains the display, i.e. the portion of the watch that typically rests against the back of the user's wrist in use. Conventionally, buttons have been arranged on the watch face of the display housing, e.g. as shown in FIG. 1. This has meant that the display housing has been required to be relatively large in order to provide an acceptable area of display in addition to the area for the buttons. This problem has been overcome in the prior art by providing the watch buttons circumferentially around the side edges of the display housing. However, in order to activate such a button the user must press the button with one finger and counter-balance that pressing force by using another finger on the opposite side of the display housing. This is not always easy in many of the conditions that fitness watches are used under. As the present invention separates the user interface from the display housing it is able to overcome these problems.

The display is configured to display alphanumeric characters or icons such that upper parts of the characters or icons are arranged towards a first side of the display housing and the lower parts of the characters or icons are arranged towards a second, opposite side of the display housing. The user interface is preferably spaced apart from the display housing in a direction from said first side to said second side. This configuration is useful when the user wears the display housing on the back of the wrist, as the user is easily able to view the display whilst controlling the watch via the user interface that is spaced apart from the display. Less preferably, the user interface may be spaced apart from the display housing in a direction from said second side to said first side of the display housing. This configuration may be useful, for example, when the watch is strapped to the handle bars of a bicycle or strapped to another vehicle, as the display can be directed towards the user whilst the user has easy access to the user interface from above the watch.

The watch case has a lower surface that contacts a user's arm or wrist in use and an upper, opposite surface that faces away from the user's arm or wrist in use. The upper surface is preferably recessed between the display housing and the user interface.

The input means is configured to control the watch in use. For example, the input means may control the functioning of the watch and may be used to navigate through a menu displayed on the watch. The input means is therefore electrically connected to electronic components in the display housing. For example, a ribbon lead may extend between the display housing and the user interface.

The input means preferably has a substantially planar surface arranged substantially parallel to and above a portion of the upper surface.

The input means is preferably configured to detect the movement of a user's finger across the substantially planar surface so as to provide an input to control the watch, e.g. for navigating a menu displayed on the display of the watch. The input means may therefore comprise a touchpad (or trackpad) utilising, for example, capacitive sensing to conductance sensing to translate the motion of a user's finger into an input to control the watch. The touchpad may comprise a one-dimensional touchpad, and which is capable of sensing motion along a single axis, e.g. left-right or up-down. In other more preferred embodiments, the touchpad may comprise a two-dimensional touchpad, and which is capable of sensing motion in any direction, or at least left-right and up-down, on the plane defined by the substantially planar surface of the input means.

In other, albeit less preferred embodiments, the input means may comprise a pointing stick (or trackpad) that senses the force applied by a user's finger, e.g. by using a pair of resistive strain gauges, and translates it into an input to control the watch. Alternatively, the input means may comprise a two-way button having a continuous pressing surface and two actuators, the button being configured such that when a first portion of the pressing surface is depressed a first of said actuators is actuated so as to provide a first input to control the watch, and when a second portion of the pressing surface is depressed a second of said actuators is actuated so as to provide a second input to control the watch. Alternatively, the input means may comprise a four-way button having a continuous pressing surface and four actuators, the button being configured such that when a first portion of the pressing surface is depressed a first of said actuators is actuated so as to provide a first input to control the watch, when a second portion of the pressing surface is depressed a second of said actuators is actuated so as to provide a second input to control the watch, when a third portion of the pressing surface is depressed a third of said actuators is actuated so as to provide a third input to control the watch, and when a fourth portion of the pressing surface is depressed a fourth of said actuators is actuated so as to provide a fourth input to control the watch. The pressing surface described herein is preferably said substantially planar surface parallel to and above a portion of the lower surface that contacts a user's arm or wrist in use. It is also contemplated that the user interface may comprise any one or more mechanically actuated buttons or non-mechanically actuated buttons, such as virtual buttons on a touch-sensitive user interface, as desired.

The input means is preferably additionally, or alternatively, configured to be operated by being pressed in a direction that is substantially perpendicular to its substantially planar surface, in a direction from the upper surface towards the lower surface. This enables the user to use a single finger to operate the user interface. The user does not need to use a second finger of the same hand to counter-balance the pressing of the user interface, because the user interface is arranged such that it is pressed against the wrist of the user wearing the watch.

In preferred embodiments in which the input means is configured to both detect the movement of a user's finger across the substantially planar surface and be pressed against the wrist of the user, e.g. where in the user interface comprises a depressible touch pad, the detected motion of the user's finger is used to navigate a menu of the watch for identifying a function to be selected, and the depression of the input means is used to select the identified function.

As discussed above, the input means preferably has a substantially planar surface arranged substantially parallel to and above a portion of the upper surface, and which in some embodiments comprises a pressing surface for controlling the watch when pressed. In embodiments, the user interface defines a chamber, e.g. beneath the planar (or pressing) surface, which as discussed in more detail below can be used to house one or more components of the fitness watch, rather than in the display housing.

For example, in embodiments, the chamber may house an antenna, such as a patch antenna, of a global navigation satellite systems (GNSS) receiver, arranged to receive signals transmitted from navigation satellites. As will be appreciated, a fitness watch preferably comprises means for tracking the location of the user as he or she moves from one location to another, which in preferred embodiments comprises a GNSS receiver, such as a GPS receiver, for receiving satellite signals indicating the position, and optionally speed, of the receiver (and thus user) at a particular point in time, and which receives updated information at regular intervals. This configuration, i.e. with the antenna being housed in the chamber, is advantageous in that it is separated from the display housing and so is not located on the back of the user's wrist in use. Rather, the spacing of the chamber away from the display housing enables the antenna to be located on the side of the user's wrist in use. As such, when the watch is being used for activities such as fast walking, jogging or running the location sensor will naturally be directed, substantially vertically, upwards so as to be at the optimum angle to receive data from the satellites. Also, if the watch is strapped to the handle bars of a bicycle then the display could be arranged to face the user, whilst the chamber, and thus antenna, are directed vertically upwards. The housing of the antenna in the chamber also provides the benefit of allowing the display housing of the watch case to have a thinner profile than is typically possible with conventional fitness watches, as the patch antenna no longer needs to be stacked on top of the battery.

It is contemplated that the display housing of the watch case may house any one or any combination of two or more of the following other components of the watch: a battery for powering the watch; a printed circuit board (PCB), e.g. with the GNSS processing unit (or chipset); a pressure sensor for measuring atmospheric pressure (for use in determining altitude and/or depth); a pulse sensor; a vibration device for indicating alerts to a user; an accelerometer; an electronic compass; a processor; or a wireless communications device, such as a Bluetooth module (e.g. capable of using the Bluetooth Low Energy (BLE) protocol).

It is also contemplated that alternative or additional components of the watch could be housed in the chamber, rather than in the display housing. For example, the chamber may house any one or any combination of two or more of the following components of the watch: a battery for powering the watch; a printed circuit board (PCB), e.g. with the GNSS processing unit (or chipset); a pressure sensor for measuring atmospheric pressure (for use in determining altitude and/or depth); a pulse sensor; a vibration device for indicating alerts to a user; an accelerometer; an electronic compass; a processor; or a wireless communications device, such as a Bluetooth module (e.g. capable of using the Bluetooth Low Energy (BLE) protocol).

The display housing preferably has a substantially planar display, such as an LCD display, arranged in a first plane and the user interface preferably has a substantially planar (pressing) surface arranged in a second plane, wherein the first and second planes are at angles to each other. The dihedral (or torsion) angle between the two planes is preferably less the 90 degrees, and preferably between 20 and 70 degrees. In other words, the planes are imaginary intersecting planes and the sides of the planes facing the user's arm or wrist in use define an angle between them at the intersection, wherein the angle is preferably greater than 90 degrees and less than 180 degree. By providing the surfaces at an angle to each other, the user is enabled a good viewing angle of the display whilst operating the user interface, when the watch is being worn. As the user interface is spaced away from the display housing, and hence away from the back of the user's wrist and around the side of the wrist in use, said angle also enables the user interface to be orientated such that when it is pressed it is pressed against the user's wrist such that the user's wrist provides the counter-force necessary to balance the pressing force. The user interface is therefore able to be operated with a single finger and without needing a second finger on the same hand to counter-balance the pressing force as in conventional watches having buttons around the periphery of the display housing.

The display housing is preferably physically connected to the user interface by a connecting portion, wherein the connecting portion is curved or angled along the direction from the display housing to the user interface. The connecting portion may be curved or angled such that when the display housing is arranged on the back of a user's wrist in use, the connecting portion curves or otherwise extends around the wrist such that the user interface is located on the side of the user's wrist. The watch is preferably configured such that the user interface is located on the medial side of the user's wrist when the display housing is located on the back of the wrist, the medial side being the side facing the user's body when the back of the hand is facing vertically upwards.

The watch case may comprise one or more electrical connectors for electrically connecting said casing to a dock or cable for charging a battery in said casing and/or for transferring data into or out of said casing. It is contemplated that any of the known electrical connectors may be employed on the watch. In preferred embodiments, however, the one or more electrical connectors comprise electrical contacts, which may be flat and arranged substantially in line with, or recessed in, the lower surface of the case (for contacting with corresponding pogo pins in a docking system). The electrical contacts may be located in any portion of the lower surface of the case as desired, although in preferred embodiments the electrical contacts are located in the lower surface under the user interface portion of the watch case, e.g. at the end of the lower surface that is distal from the display housing. This allows the user to see the watch display when the watch case is positioned in a docking system.

The watch case is preferably configured as a module encasing the electrical components of the fitness watch, and which is preferably a sealed module being water resistant to allow the watch to be used for wet weather outdoor exercise and for swimming. In other words, the display housing and the user interface are preferably arranged in a single integral casing having a display housing portion and a user interface portion separated by the connecting portion. The connecting portion is therefore preferably also part of the integral casing. In this configuration, the watch case can be removably mounted, i.e. repeatedly engaged and disengaged, to a plurality of different docking solutions. For example, the watch case can be connectable to, or insertable into one or more apertures in, a strap for securing the watch to the arm of wrist of a user and/or for securing the module to a bicycle or other vehicle, such as a kayak. The watch case can also be placed in a dock that is desired to be kept in the user's home, e.g. for allowing the transfer of power and/or data to the watch components. In embodiments in which the watch case is insertable into one or more apertures in a strap, the case, and preferably the user interface and/or the display housing, comprises one or more projections and/or recesses for releasably engaging with corresponding features of the strap. When the watch case is connected to, or inserted into, a strap, the user interface is preferably spaced apart from the display housing in a longitudinal direction of the strap.

In other less preferred embodiments the strap may form said connecting portion that connects the display housing portion and the user interface portion. As described above, the connecting portion is preferably curved or angled so as to extend around the user's wrist in use. The strap may be flexible or formed from one or more pivotable sections so as to flex or pivot to form the curved or angled portion.

The present invention also provides a system comprising a watch as described above and a docking system for charging or exchanging data with the watch, wherein the docking system comprises docking electrical connectors for connecting with the electrical connectors on the watch in order to supply electrical charge and/or data to the electrical connectors of the watch and/or to receive data from the watch.

The dock preferably has a slot for receiving at least a portion of the watch casing therein, and wherein the electrical connectors of the watch and the docking connectors are arranged and configured to engage with each other within the slot.

The electrical connectors on the watch are preferably electrical contacts, which may be flat and may be arranged substantially in line with a surface of the watch casing so as not to catch the user in use. The electrical connectors in the dock may be resiliently biased connectors, such as pogo connectors, that are biased into engagement with the connectors on the watch when the watch is docked. However, it is contemplated that any of the well known means of electrical connectors may be employed on the watch or in the dock.

Although the present invention has been described with reference to a fitness watch case, i.e. a watch capable of monitoring athletic performance and thus comprising means for tracking the location of a user as he or she moves fro one location to another (e.g. by using information received from global navigation satellite signals, or by accessing and receiving information from WiFi access points or cellular communication networks), it will be appreciated that spacing the user interface from the display housing can also be an beneficial arrangement in any form of watch.

The present invention in accordance with any of its further aspects or embodiments may include any of the features described in reference to other aspects or embodiments of the invention to the extent it is not mutually inconsistent therewith.

Advantages of these embodiments are set out hereafter, and further details and features of each of these embodiments are defined in the accompanying dependent claims and elsewhere in the following detailed description.

BRIEF DESCRIPTION OF THE DRAWINGS

Various aspects of the teachings of the present invention, and arrangements embodying those teachings, will hereafter be described by way of illustrative example with reference to the accompanying drawings, in which.

Like reference numerals are used for the like features throughout the drawings.

DETAILED DESCRIPTION OF THE PREFERRED EMBODIMENTS

Preferred embodiments of the present invention will now be described with particular reference to a fitness or sports watch having access to Global Positioning System (GPS) data. Fitness or sports watches of the type described are often worn by athletes to help them during their runs or workouts, e.g. by monitoring the speed and distance of the user and providing this information to the user. It will be appreciated, however, that the device could be arranged to be carried by a user or connected or "docked" in a known manner to a vehicle such as a bicycle, kayak, or the like.

Figure 1:
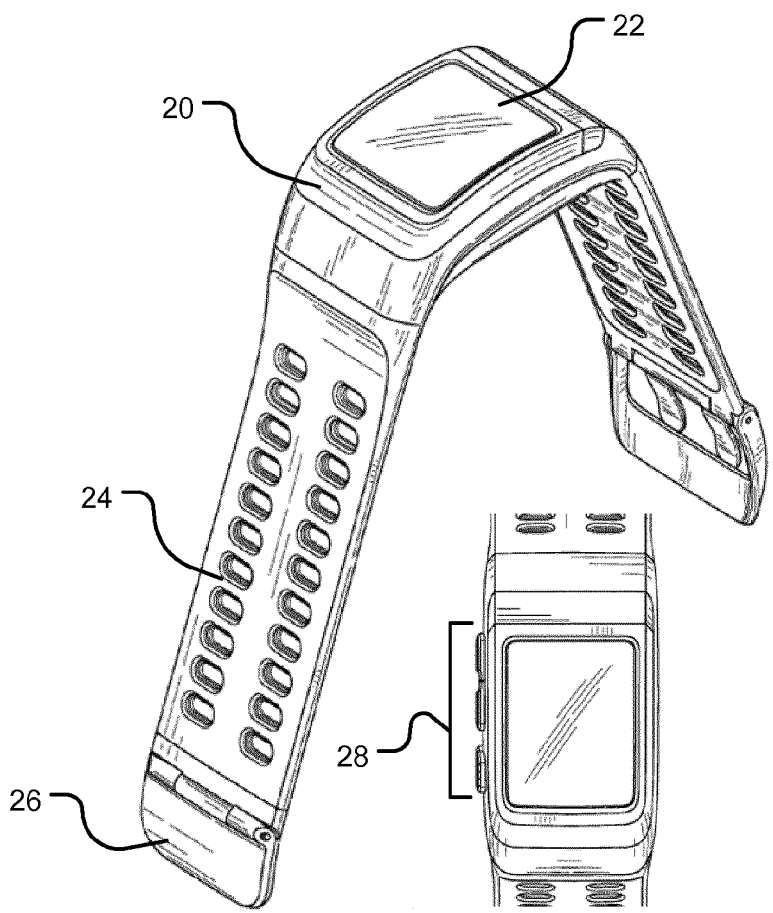
FIG. 1 shows a perspective view of an exemplary conventional fitness watch.
Figure 2:
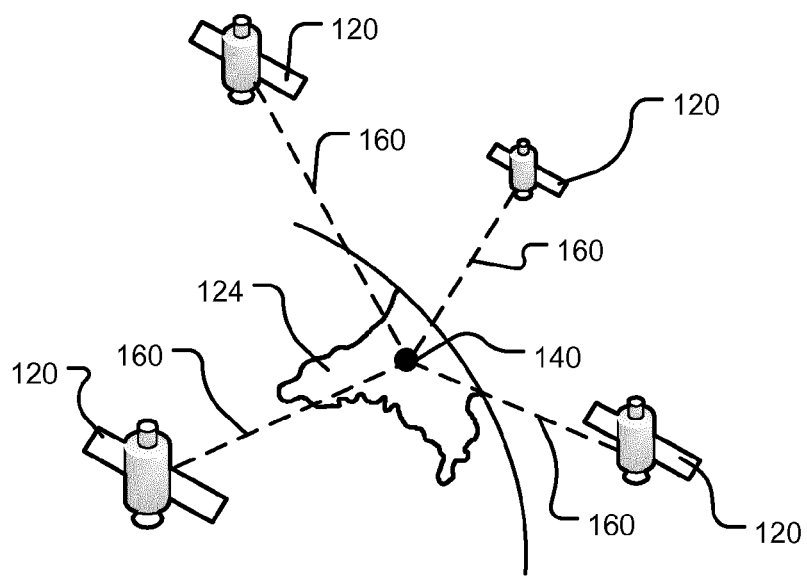
FIG. 2 is a schematic illustration of a Global Positioning System (GPS)

FIG. 2 illustrates an example view of Global Positioning System (GPS), usable by such devices. Such systems are known and are used for a variety of purposes. In general, GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 2, the GPS system is denoted generally by reference numeral 100. A plurality of satellites 120 are in orbit about the earth 124. The orbit of each satellite 120 is not necessarily synchronous with the orbits of other satellites 120 and, in fact, is likely asynchronous. A GPS receiver 140 is shown receiving spread spectrum GPS satellite signals 160 from the various satellites 120.

The spread spectrum signals 160, continuously transmitted from each satellite 120, utilize a highly accurate frequency standard accomplished with an extremely accurate atomic clock. Each satellite 120, as part of its data signal transmission 160, transmits a data stream indicative of that particular satellite 120. It is appreciated by those skilled in the relevant art that the GPS receiver device 140 generally acquires spread spectrum GPS satellite signals 160 from at least three satellites 120 for the GPS receiver device 140 to calculate its two-dimensional position by triangulation. Acquisition of an additional signal, resulting in signals 160 from a total of four satellites 120, permits the GPS receiver device 140 to calculate its three-dimensional position in a known manner.

Figure 3:
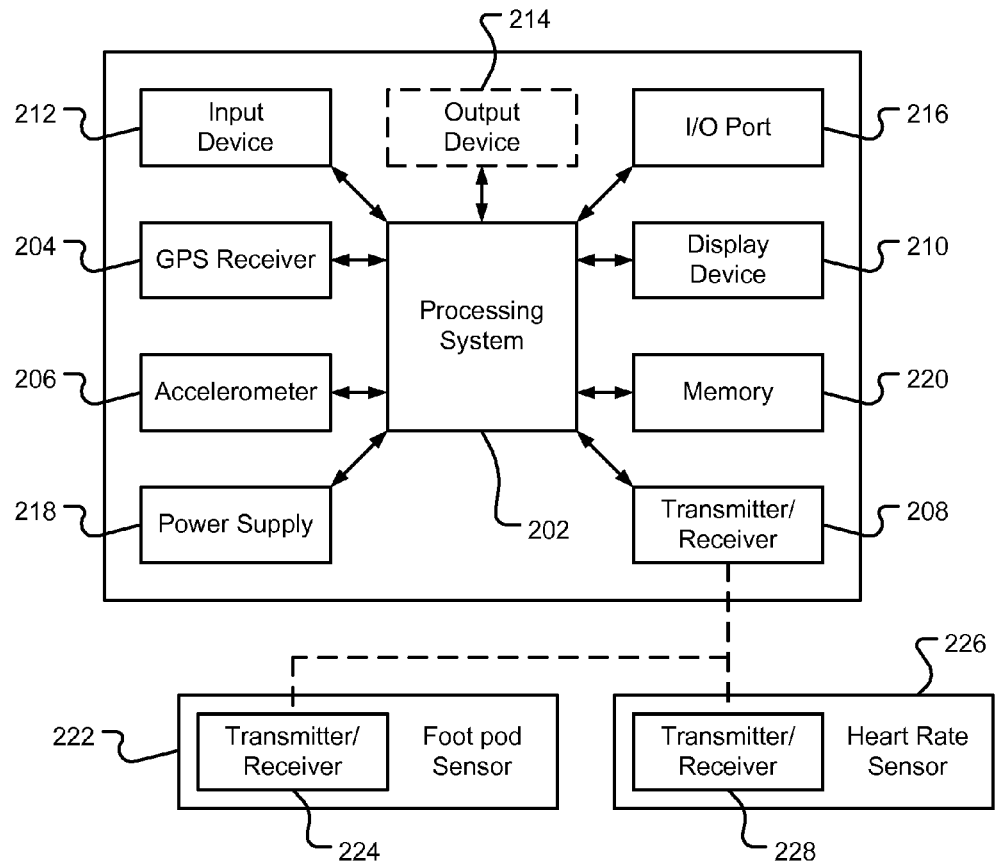
FIG. 3 is a schematic illustration of electronic components of a fitness watch according to a preferred embodiment.

FIG. 3 is an illustrative representation of electronic components of a sports watch 200 according to a preferred embodiment of the present invention, in block component format. It should be noted that the block diagram of the device 200 is not inclusive of all components of the device, but is only representative of many example components.

The device 200 includes a processor 202 connected to an input device 212, such as a depressible touchpad (or trackpad), and a display screen 210, such as an LCD display. The device 200 can further include an output device arranged to provide audible information to a user, such as alerts that a certain speed has been reached or a certain distance has been travelled.

FIG. 3 further illustrates an operative connection between the processor 202 and a GPS antenna/receiver 204. Although the antenna and receiver are combined schematically for illustration, the antenna and receiver may be separately located components. The antenna may be of any suitable form, but in preferred embodiments is a GPS patch antenna.

The device 200 further includes an accelerometer 206, which can be a 3-axis accelerometer arranged to detect accelerations of the user in x, y and z directions. The accelerometer may act as a pedometer for use when/if there is a loss of GPS reception, and/or may act to detect stroke rate when the fitness watch is being used during swimming. Although the accelerometer is shown to be located within the device, the accelerometer may also be a external sensor worn or carried by the user, and which transmits data to the device 200 via the transmitter/receiver 208.

The device may also receive data from other sensors, such as a foot pod sensor 222 or a heart rate sensor 226. The foot pod sensor may, for example, be a piezoelectric or microelectro-mechanical systems (MEMS) accelerometer that is located in or on the sole of the user's shoe. Each external sensor is provided with a transmitter and receiver, 224 and 228 respectively, which can be used to send or receiver data to the device 200 via the transmitter/receiver 208.

The processor 202 is operatively coupled to a memory 220. The memory resource 220 may comprise, for example, a volatile memory, such as a Random Access Memory (RAM), and/or a non-volatile memory, for example a digital memory, such as a flash memory. The memory resource 220 may be removable. As discussed in more detail below, the memory resource 220 is also operatively coupled to the GPS receiver 204, the accelerometer 206 and the transmitter/receiver 208 for storing data obtained from these sensors and devices.

Further, it will be understood by one of ordinary skill in the art that the electronic components shown in FIG. 3 are powered by a power source 218 in a conventional manner. The power source 218 may be a rechargeable battery.

The device 200 further includes an input/output (I/O) device 216, such as a plurality of electrical contacts or a USB connector. The I/O device 216 is operatively coupled to the processor, and also at least to the memory 220 and power supply 218. The I/O device 216 is used, for example, to: update firmware of processor 220, sensors, etc; transfer data stored on the memory 220 to an external computing resource, such as a personal computer or a remote server; and recharge the power supply 218 of the device 200. Data could, in other embodiments, also be sent or received by the device 200 over the air using any suitable mobile telecommunication means.

As will be understood by one of ordinary skill in the art, different configurations of the components shown in FIG. 3 are considered to be within the scope of the present application. For example, the components shown in FIG. 3 may be in communication with one another via wired and/or wireless connections and the like.

Figure 4:
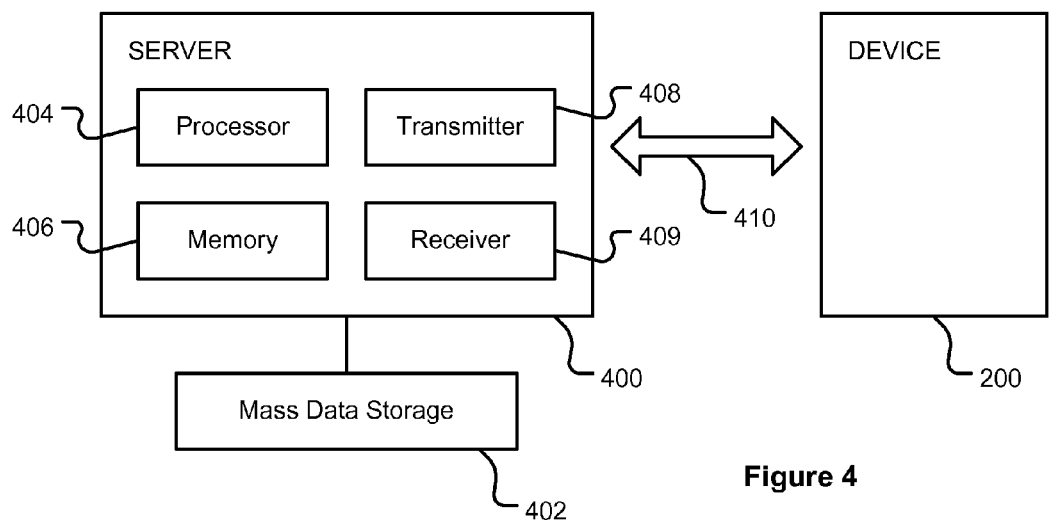
FIG. 4 is a schematic illustration of the manner in which a fitness watch may receive information over a wireless communication channel.

In FIG. 4 the watch 200 is depicted as being in communication with a server 400 via a generic communications channel 410 that can be implemented by any number of different arrangements. The server 400 and device 200 can communicate when a connection is established between the server 400 and the watch 200 (noting that such a connection can be a data connection via mobile device, a direct connection via personal computer via the internet, etc.).

The server 400 includes, in addition to other components which may not be illustrated, a processor 404 operatively connected to a memory 406 and further operatively connected, via a wired or wireless connection, to a mass data storage device 402. The processor 404 is further operatively connected to transmitter 408 and receiver 409, to transmit and send information to and from device 200 via communications channel 410. The signals sent and received may include data, communication, and/or other propagated signals. The functions of transmitter 408 and receiver 409 may be combined into a signal transceiver.

The communication channel 410 is not limited to a particular communication technology. Additionally, the communication channel 410 is not limited to a single communication technology; that is, the channel 410 may include several communication links that use a variety of technology. For example, the communication channel 410 can be adapted to provide a path for electrical, optical, and/or electromagnetic communications, etc. As such, the communication channel 410 includes, but is not limited to, one or a combination of the following: electric circuits, electrical conductors such as wires and coaxial cables, fibre optic cables, converters, radio-frequency (RF) waves, the atmosphere, empty space, etc. Furthermore, the communication channel 410 can include intermediate devices such as routers, repeaters, buffers, transmitters, and receivers, for example.

In one illustrative arrangement, the communication channel 410 includes telephone and computer networks. Furthermore, the communication channel 410 may be capable of accommodating wireless communication such as radio frequency, microwave frequency, infrared communication, etc. Additionally, the communication channel 410 can accommodate satellite communication.

The server 400 may be a remote server accessible by the watch 200 via a wireless channel. The server 400 may include a network server located on a local area network (LAN), wide area network (WAN), virtual private network (VPN), etc.

The server 400 may include a personal computer such as a desktop or laptop computer, and the communication channel 410 may be a cable connected between the personal computer and the watch 200. Alternatively, a personal computer may be connected between the watch 200 and the server 400 to establish an internet connection between the server 400 and the watch 200. Alternatively, a mobile telephone or other handheld device may establish a wireless connection to the internet, for connecting the watch 200 to the server 400 via the internet.

The server 400 is further connected to (or includes) a mass storage device 402. The mass storage device 402 contains a store of at least digital map information. This digital map information can be used, together with data from the device, such as time-stamped location data obtained form the GPS receiver 204 and data indicative of motion of the wearer obtained from the accelerometer 206, footpad sensor 222, etc, to determine a route travelled by the wearer of the device 200, which can then be viewed by the wearer.

As will be appreciated, the watch 200 is designed to be worn by a runner or other athlete as they undertake a run or other similar type of workout. The various sensors within the watch 200, such as the GPS receiver 204 and the accelerometer 206, collect data associated with this run, such as the distance travelled, current speed, etc, and display this data to the wearer using the display screen 210.

Figure 5:
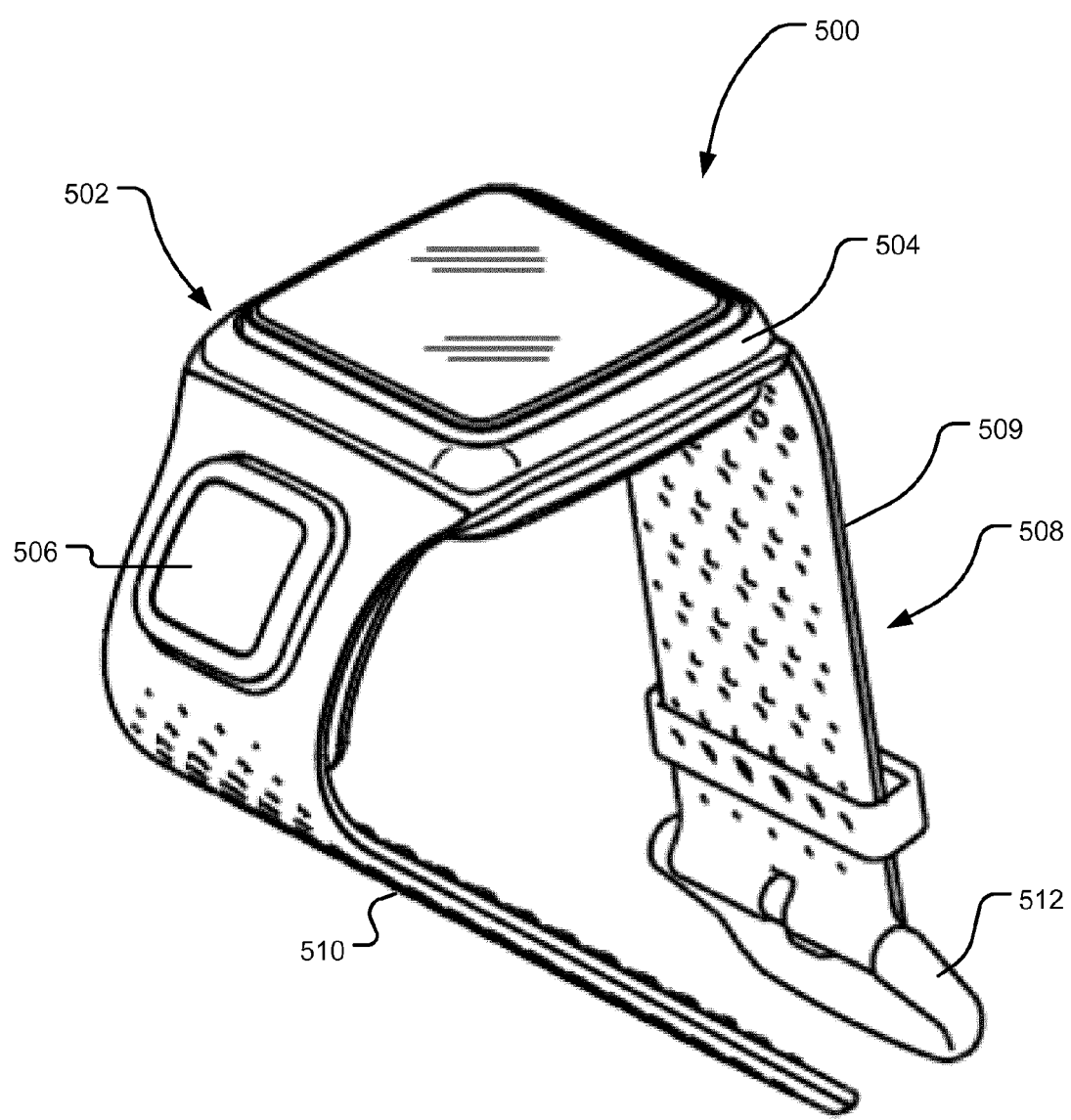
FIG. 5 shows a perspective view of a fitness watch casing (or module) according to a preferred embodiment of the present invention positioned in a strap.
Figure 8:
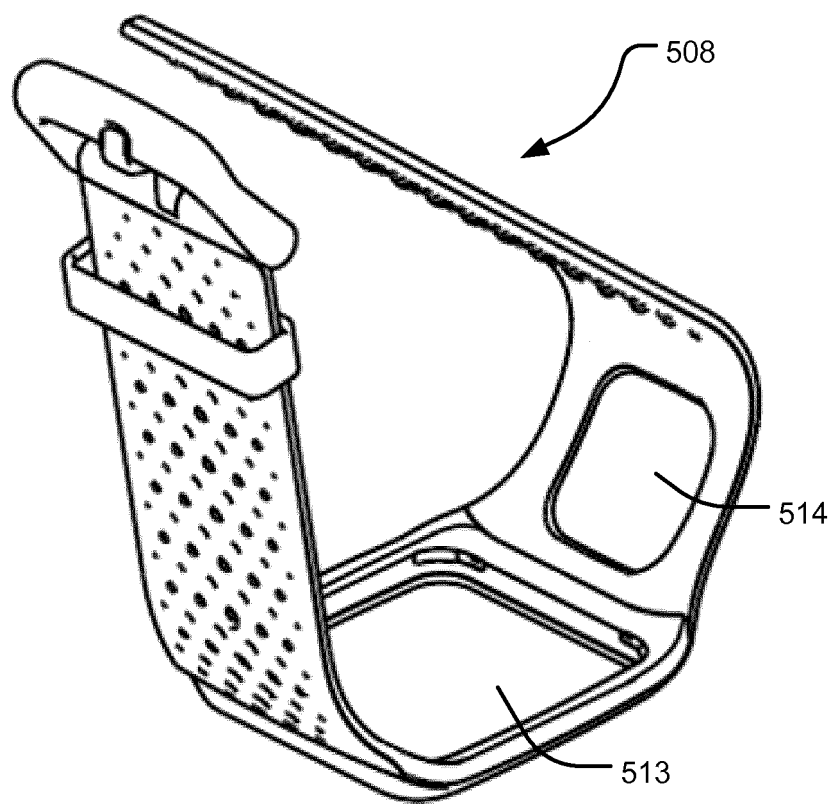
FIG. 8 shows the watch strap of FIG. 5 without the fitness watch casing (or module)

FIG. 5 shows a perspective view of a fitness watch casing 502 according to a preferred embodiment of the present invention, which is in the form of a module that can be inserted into a plurality of different docking solutions. The watch casing 502 comprises a display housing 504 and a user interface 506, which are spaced apart from each other. In the embodiment depicted in FIG. 5 the watch casing 502 is inserted into apertures 513 and 514 in a strap 508 (as shown in FIG. 8); the strap being wearable on the wrist of a user to create a fitness watch 500. As will be appreciated, the user interface portion 506 of the watch casing 500 is arranged to pass through aperture 514, and the display housing portion 504 is arranged to pass through the aperture 513. The strap 508 is formed of two parts 509, 510 that connect to each other by a buckle 512, in the conventional way. Cooperating projections and recesses on the watch casing 500 and the strap 508, e.g. the projections 519 shown in FIG. 6, allow the watch casing 500 to releasably engage and be maintained in position within the strap 508.

Figure 6:
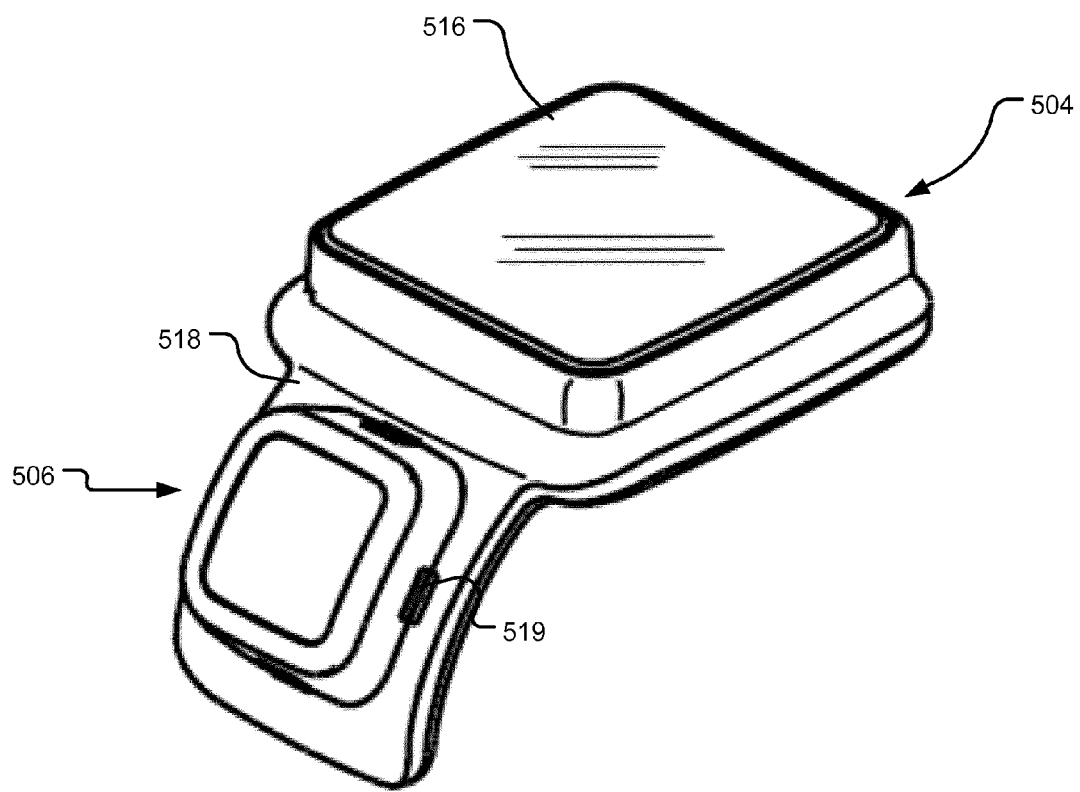
FIG. 6 shows the watch casing (or module) of FIG. 5.

FIG. 6 shows a perspective view of the watch casing 502, once the module has been disengaged from the strap 508. As described above, the casing 502 has a display housing 504 and a user interface 506 that is spaced apart from the display housing. The display housing portion 504 is of substantially parallelepiped construction and has a substantially planar display 516 for displaying information to the user. This portion of the watch sits on the back of the user's wrist in use. The user interface portion 506 is connected to the display housing 504 by a connecting portion 518. This connecting portion 518 can be seen as a flange that extends away from the display housing 504. The flange 518 curves as it extends away from the display housing 504 such that it curves around the side of the user's wrist in use. The user interface 506 is located on the flange 518 such that the user interface 506 is arranged on the side of the user's wrist in use. The user interface 506 has a substantially planar pressing surface for the user to interact with the watch 500. The user can thereby press the pressing surface in a direction perpendicular to the pressing surface so as to control the watch 500, e.g. to select desired functions within the menu system of the watch.

The location of the user interface 506 being arranged on the curved flange 518 such that it sits against the side of the user's wrist in use has a number of important advantages. For example, this enables the user to interact with the watch 500 using only a single finger. More specifically, the user is able to push the pressing surface of the user interface 506 with one finger because the user pushes the surface into the user's wrist around which the watch is strapped. This is on contrast to conventional watches wherein buttons are arranged around the peripheral edges of the watch and the user must press the button with one finger and use a thumb on the other edge of the watch to counter-balance the pressing force. Also, as will be described in more detail further below, the user interface 506 may define a chamber 536 that houses one or more other components, such as a GPS patch antenna 538 (see FIG. 9). By arranging the GPS antenna 538 at the inner side of the wrist the GPS antenna is in the optimum position for receiving GPS signals when worn by a runner, as the inner side of the wrist will be directed substantially upwards during running. As shown in FIG. 10, the plane defined by the substantially planar display of the display housing 504 is arranged at an angle to the place defined by the user interface 506, the dihedral angle 550 between the two planes being less than 90 degrees, and typically between 20 and 70 degrees.

Figure 7:
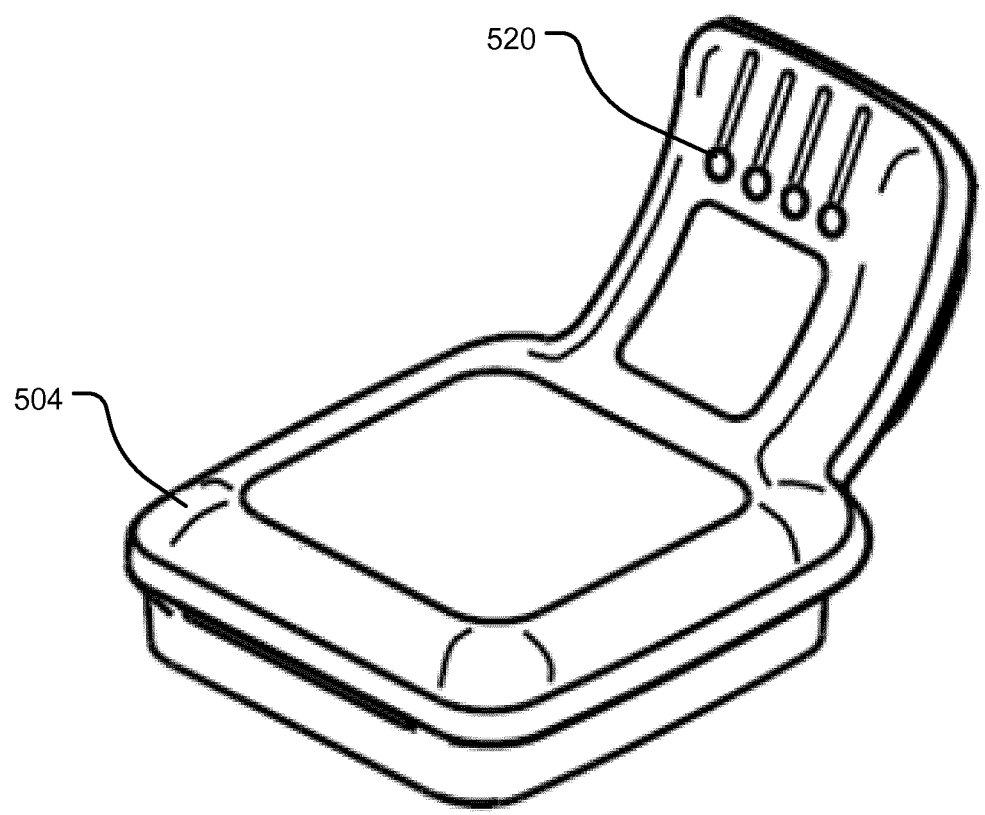
FIG. 7 shows the watch casing (or module) of FIG. 6 as viewed from the underside.

FIG. 7 shows a perspective view of the watch casing 502 from the underside of the casing. The flange 518 that extends from the display housing 504 has electrical connectors 520 arranged at a distal end thereof. These electrical connectors 520 may be used in order to electrically connect the casing 502 to another device in order to recharge a battery within the watch casing 502 or to extract data from or input data to the watch 500. As the electrical connectors 520 are arranged at the distal end of the flange 518 they are optimally arranged to be inserted into the slot of a docking device that has docking electrical connections for engaging the watch's electrical connections 520. Alternatively, the electrical connectors 520 of the watch 500 can be arranged to connect with a cable. It will be appreciated that removal of the strap 508 enables the watch 500 to be docked or connected to the cable easily. The electrical connectors 520 may be used as the input/output port 216 described in relation to FIG. 3.

Figure 9:
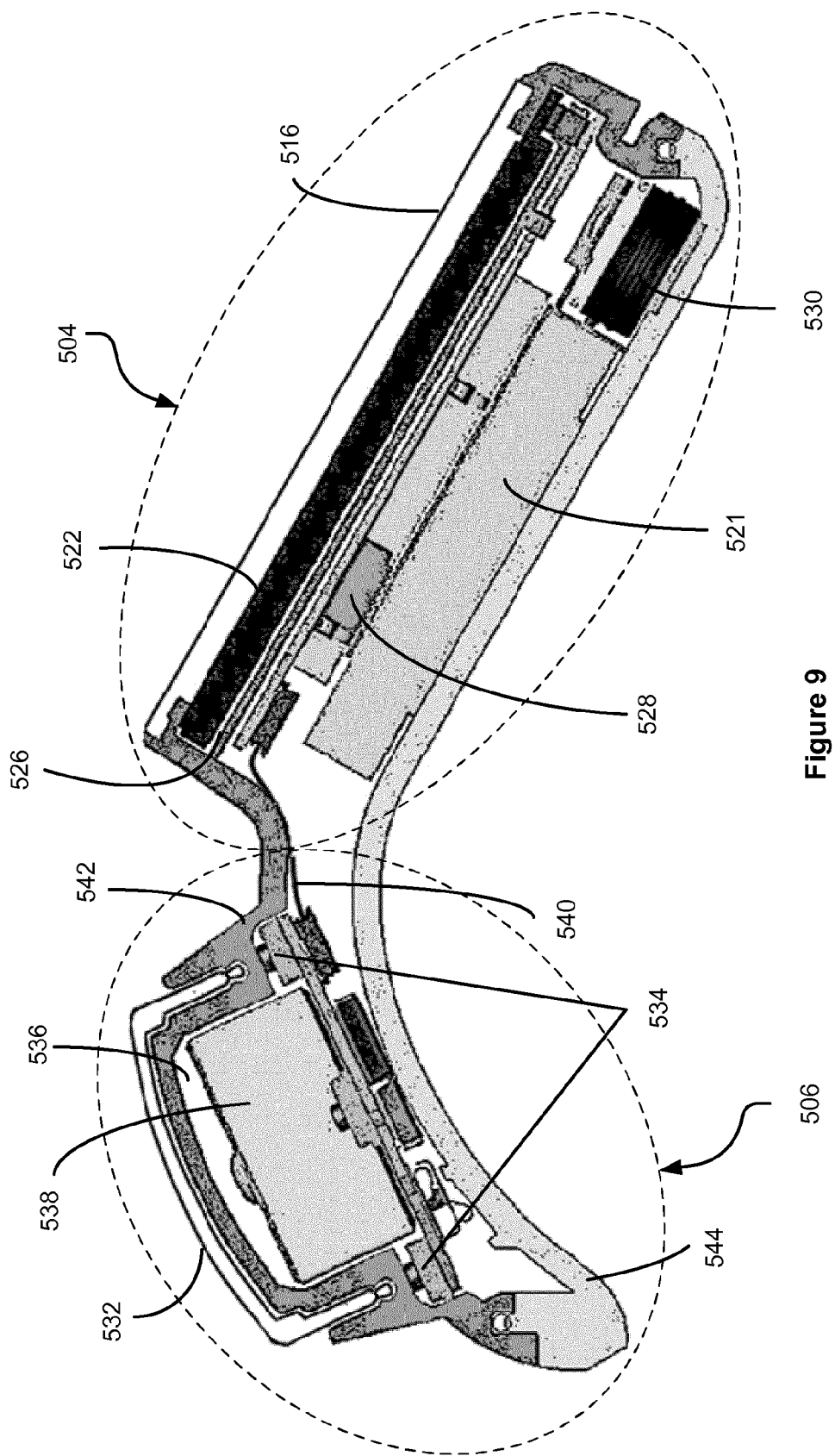
FIG. 9 shows a cross-section through the watch casing and illustrates the components within the casing.
Figure 10:
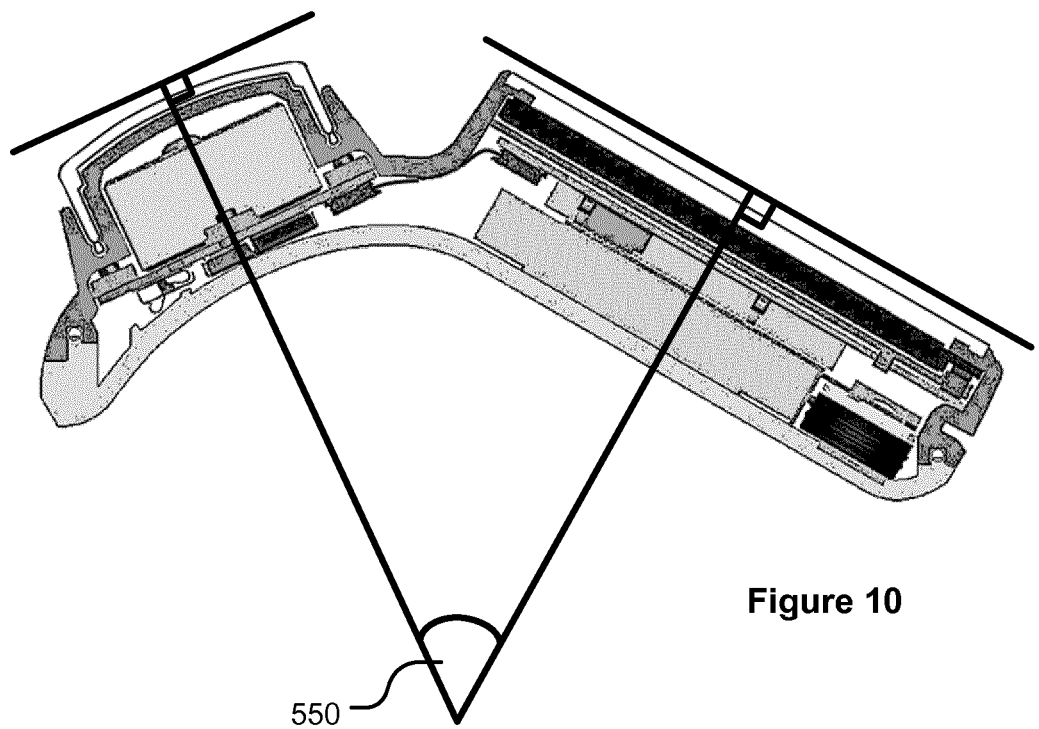
FIG. 10 shows the dihedral (or torsion) angle between the plane defined by the display in the display housing and the plane defined by the surface of the user interface.

FIG. 9 shows a cross-section through the casing 502 of the watch and shows the preferred arrangement of the basic components of the watch.

The display housing portion 504 comprises a battery (preferably a rechargeable battery) 521, a liquid crystal display (LCD) display 522, a lens screen 524 above the LCD display 522 and a printed circuit board (PCB) 526 below the LCD display 522. The PCB 526 will typically include the GNSS chipset, which is operatively connected to a patch antenna 538, and which is arranged to process the received satellite signals to determine the location and speed of the device. The PCB 526 further comprises a wireless communications device, such as a Bluetooth chipset, which is preferably capable of using the Bluetooth Low Energy (BLE) protocol that forms part of the Bluetooth v4.0 specification, and can be used to form connections with one or more external sensors, such as a heart rate monitor and a foot pod sensor. The display housing portion 504 also comprises a pressure sensor 528 and a vibration device 530. The pressure sensor 528 serves to detect the ambient pressure of the environment that the watch 500 is in. For example, the sensor 528 may be used to detect pressure under water and may correlate this to an estimation of depth within the water. Alternatively, the pressure sensor 528 may be used to determine altitude. The vibration device 530 is arranged adjacent to the lower side of the casing 502 so as to be very near to the wearer of the watch. The vibration device 530 is configured to vibrate when activated so as to provide alerts to the user. As can be seen from FIG. 9, the watch casing 502 is formed as a single module with an upper casing 542 engaging with a lower casing 544, the electronic components of the watch being encased between the upper and lower casings.

The user interface portion 506 defines a chamber 536 in which watch components may be located. The chamber 536 may be defined by the button bezel 532 and the lower casing 544. The patch antenna 538 is located in the chamber 536. As described above in relation to FIG. 6, this arrangement enables the antenna 538 to sit on the medial side of the user's wrist and therefore for the GPS antenna 538 to be directed upwards naturally when being worn during running. This is in contrast to conventional sports watches in which the GPS antenna is arranged under the display. As the displays in such conventional watches are designed to sit on the back of a user's wrist, the display, and hence the GPS antenna, does not face upwards whilst the user is running and so is not in the optimal position to receive GPS signals. The preferred location of the GPS antenna 538 outside of the display housing portion 504, according to the embodiments of the present invention, also enables the size of the watch housing portion 504 to be reduced for a given number of components. The electronics in the user interface portion 506 are electrically connected to the electronics in the display housing portion 504, such as by a ribbon cable 540.

The user interface portion 506 comprises a touchpad (or trackpad) 532 utilising, for example, capacitive sensing to conductance sensing to translate the motion of a user's finger into an input to control the watch. The touchpad may comprise a one-dimensional touchpad, and which is capable of sensing motion along a single axis, e.g. left-right or up-down. In other more preferred embodiments, the touchpad 532 comprises a two-dimensional touchpad, and which is capable of sensing motion in any direction, or at least left-right and up-down, on the plane defined by the substantially planar surface of the input means. The touchpad 532 is further configured to be depressible, for example for use in selecting desired functions within the menu system of the watch. This enables the user to use a single finger to operate the user interface. The user does not need to use a second finger of the same hand to counter-balance the pressing of the user interface, because the user interface is arranged such that it is pressed against the wrist of the user wearing the watch. As shown in FIG. 9, the depression of the touchpad is detected by the sensors 534, which translate the detected motion into an electrical signal for transmittal via the ribbon cable 540 to the relevant components within the display housing 504.

In other embodiments, the user interface portion 506 may utilise other types of input means, such as a pointing stick that senses the force applied by a user's finger, e.g. by using a pair of resistive strain gauges, and translates it into an input to control the watch. Alternatively, the input means may comprise a two-way button having a continuous pressing surface and two actuators, the button being configured such that when a first portion of the pressing surface is depressed a first of said actuators is actuated so as to provide a first input to control the watch, and when a second portion of the pressing surface is depressed a second of said actuators is actuated so as to provide a second input to control the watch. Alternatively, the input means may comprise a four-way button having a continuous pressing surface and four actuators, the button being configured such that when a first portion of the pressing surface is depressed a first of said actuators is actuated so as to provide a first input to control the watch, when a second portion of the pressing surface is depressed a second of said actuators is actuated so as to provide a second input to control the watch, when a third portion of the pressing surface is depressed a third of said actuators is actuated so as to provide a third input to control the watch, and when a fourth portion of the pressing surface is depressed a fourth of said actuators is actuated so as to provide a fourth input to control the watch. The pressing surface described herein is preferably said substantially planar surface parallel to and above a portion of the lower surface that contacts a user's arm or wrist in use. It is also contemplated that the user interface may comprise any one or more mechanically actuated buttons or non-mechanically actuated buttons, such as virtual buttons on a touch-sensitive user interface, as desired.

As described above, the user interface portion 506 comprises a trackpad that can detect the movement of a user's finger in two dimensions across its surface. This is particularly useful for navigating the menu system displayed by the display 522. The embodiments of the present invention preferably use a "cube" design menu system, such as that shown in FIG. 11. The "cube" menu system is so called as it resembles the structure of a cube if the cube faces were unfolded.

Figure 11:
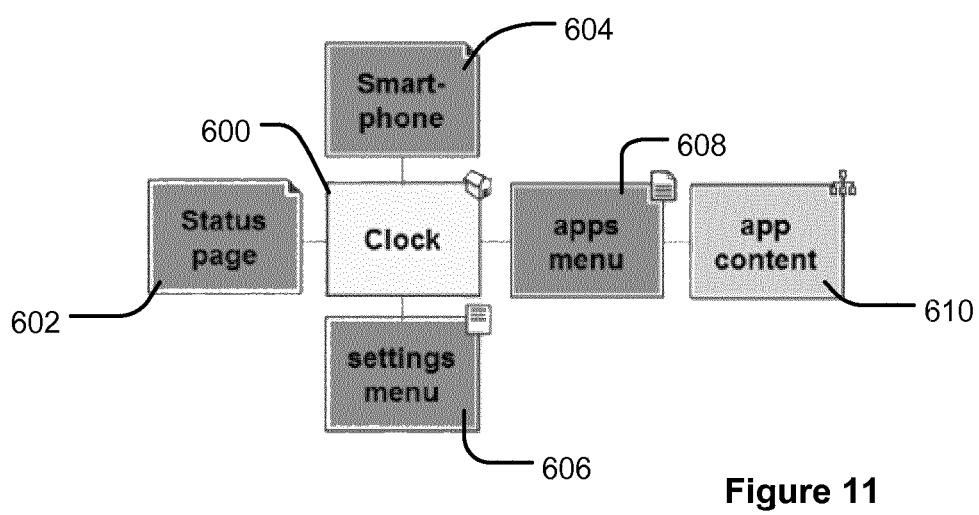
FIG. 11 shows a schematic of the preferred menu system on the watch.
Figure 12:
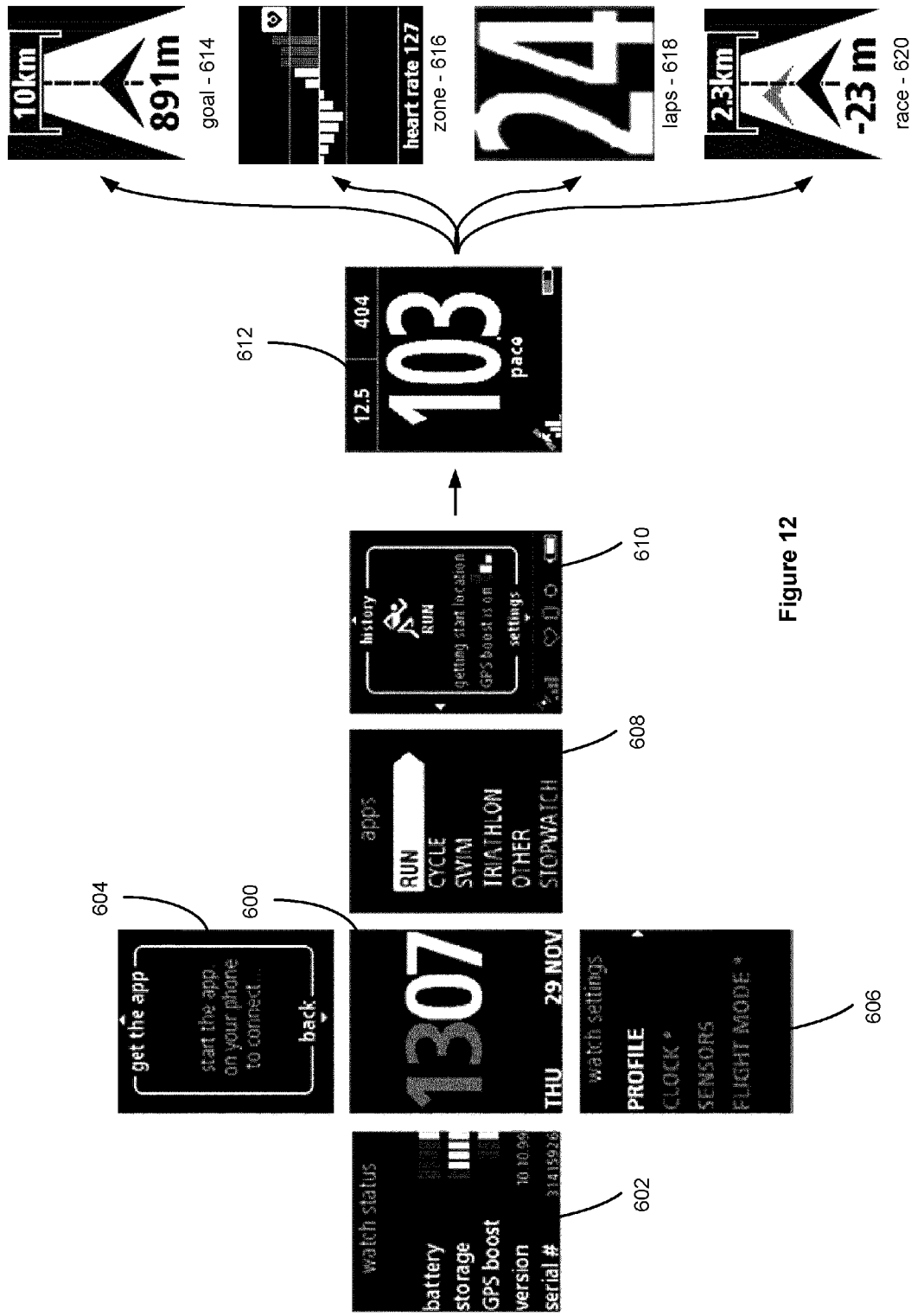
FIG. 12 shows examples of display screens that may be displayed by the watch for the menu system depicted in FIG. 11.

FIG. 11 shows a generic schematic of a menu system and FIG. 12 shows an example of the type of content that may be included in each part of the menu system. As shown in FIGS. 11 and 12, the display may have a default home screen 600 that may display a clock or other information. The user is able to indicate an up, down, left or right movement on the trackpad 532 movement in order to navigate to four different paths of the menu system. In this example, if the user moves their finger to the left across the trackpad 532, then the screen navigates to the status page 602, which may display status information such as the battery level, the available storage capacity, the GPS reception level, the software version that is installed or the serial number of the watch 500.

In this example, if the user moves their finger upwards across the trackpad 532, then the screen navigates from the home page 600 to the smart-phone page 604. This page of the menu system may be used to initiate or control a connection with a smart-phone.

In this example, if the user moves their finger downwards across the trackpad 532, then the screen navigates from the home page 600 to the settings page 606. This enables the user to check or change the settings of the watch 500. For example, the user may view or change the watch profile, the clock, the watch sensors or the connectivity (e.g. between an aeroplane flight mode and a non-flight mode). The user may navigate up and down the individual options within the settings menu by suitable motions across the trackpad 532, and may select which of the settings to view or change by using a left or right motion across the trackpad 532 or by depressing the trackpad 532. This may take the user to further menu pages which are not illustrated in FIGS. 11 and 12.

In the example shown, if the user if the user moves their finger to the left across the trackpad 532, then the screen navigates from the home page 600 to the applications menu 608. The user may then select the type of mode that they wish to use the watch in. For example, the user may select a run mode, a cycle mode, a swimming mode, such as a pool mode and/or an open swimming mode, or a triathlon mode. The user may navigate up and down the individual options within the applications menu by suitable motions across the trackpad 532, and may select which of the modes to use by using a left or right motion across the trackpad 532 or by depressing the trackpad 532. This takes the user to the application content page 610. In the example shown in FIG. 12, the run mode has been selected and the applications content page is configured for the running mode. Once the GPS location of the device has been determined, then the watch will display the running page 612 showing the pace, distance travelled (top left) and estimated calories used (top right).

FIG. 12 shows four other displays that may be displayed by the watch once a training mode has been selected.

Screen 614 shows a "goal" mode, wherein the user has indicated the target distance that the user wishes to travel and the watch displays the distance from the current location to that target. In the example illustrated, the user has input to the watch that the goal is to travel 10 km and the watch is indicating that the distance from the current location to reach this 10 km goal is 7.5 km.

Screen 616 shows a "zone" mode, wherein the watch displays the heart rate of the user. The display also shows a bar chart of how the user's heart rate varies with time with respect to a target heart rate selected by the user.

Screen 618 shows a "lap" mode, which displays the number of laps of a circuit that the user has travelled. For example, the watch may count the number of laps of a swimming pool that the user has travelled or the number of times a predefined distance has been run, e.g. round a conventional 400 m running track.

Screen 620 shows a "race me" mode. This display is similar to that of the goal mode 614, except that a second arrow is present to indicate the location of another competitor that the user is racing. The overall distance of the race is displayed in a similar manner to that of the goal mode 614, although in this example the race distance is only 2.3 km. The distance between the user and the competitor is also shown and is 23 m in this example. The second arrow may be representative of a real competitor (if the device is able to receive location and pace data from another nearby device in real-time), or the second arrow may be representative of a virtual competitor whose progress is generated by the watch 500, e.g. based on requirements previously input by the user.

The watch 500 may indicate alerts to the user, such a when the user is starting a new lap or when the user has reached a particular target or goal. Such alerts may be provided to the user by a speaker on the watch 214, by the display 210, 522 of the watch 500 or by the vibration device 530 of the watch.

It will be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

For example, whilst embodiments described in the foregoing detailed description refer to GPS, it should be noted that the watch may utilise any kind of position sensing technology as an alternative to (or indeed in addition to) GPS. For example, the watch may utilise other global navigation satellite systems, such as the European Galileo system. Equally, it is not limited to satellite-based systems, but could readily function using ground-based beacons or other kind of system that enables the watch to determine its geographic location.

Lastly, it should be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specially enumerated in the accompanying claims at this time.

The invention claimed is:

1. A fitness watch case, comprising:
    a display housing that houses a display for displaying information to a user;

a user interface having an input for navigating through a menu displayed on the display to control the functioning of the watch; and an antenna arranged to receive signals transmitted from navigation satellites, wherein the user interface is spaced apart from the display housing, the display housing being physically connected to the user interface by a connecting portion, wherein the connecting portion is curved or angled along the direction from the display housing to the user interface such that when the display housing is arranged on the back of a user's wrist in use, the connecting portion curves or otherwise extends around the wrist such that the user interface is located on the side of the user's wrist, wherein the antenna resides in a camber defined by the user interface; and wherein the watch case has a lower surface for contacting the user's wrist in use and an upper, opposite surface for facing away from the user's wrist in use, and wherein the input has a substantially planar surface arranged substantially parallel to and above a portion of the lower surface, the input being configured to be operated by being pressed in a direction that is substantially perpendicular to its substantially planar surface, in a direction from the upper surface towards the lower surface.

2. The watch case of claim 1, wherein the watch case has a lower surface for contacting the user's wrist in use and an upper, opposite surface for facing away from the user's wrist in use, and wherein the input has a substantially planar surface arranged substantially parallel to and above a portion of the lower surface, the input being configured to be operated by being pressed in a direction that is substantially perpendicular to its substantially planar surface, in a direction from the upper surface towards the lower surface.

3. The watch case of claim 1, wherein the upper surface of the watch case is recessed between the display housing and the user interface.

4. The watch case of claim 1, wherein the display is configured to display alphanumeric characters or icons such that upper parts of the characters or icons are arranged towards a first side of the display housing and the lower parts of the characters or icons are arranged towards a second, opposite side of the display housing; and wherein the user interface is spaced apart from the display housing in a direction from said first side to said second side.

5. The watch case of claim 1, wherein the input comprises a four-way button having a continuous pressing surface and four actuators, the button being configured such that:

when a first portion of the pressing surface is depressed, a first of said actuators is actuated so as to provide a first input to navigate through the menu and control the watch, when a second portion of the pressing surface is depressed, a second of said actuators is actuated so as to provide a second input to navigate through the menu and control the watch, when a third portion of the pressing surface is depressed, a third of said actuators is actuated so as to provide a third input to navigate through the menu and control the watch, and when a fourth portion of the pressing surface is depressed, a fourth of said actuators is actuated so as to provide a fourth input to navigate through the menu and control the watch.

6. The watch case of claim 1, wherein the input comprises a touchpad arranged to translate the motion of a user's finger across its surface into an input to navigate through the menu and control the watch.

7. The watch case of claim 1, wherein the chamber is positioned on a medial side of the user's wrist and houses a patch antenna of a global navigation satellite systems (GNSS) receiver.

8. The watch case of claim 1, wherein the display housing has a substantially planar display arranged in a first plane, and wherein the substantially planar surface of the input is arranged in a second plane, the first and second planes being at angles to each other.

9. The watch case of claim 8, wherein the dihedral angle between the first and second planes is less than 90 degrees.

10. The watch case of claim 1, wherein the display housing and the user interface are arranged in a single integral casing having a display housing portion and a user interface portion separated by the connecting portion.

11. The watch case of claim 1, wherein the case comprises one or more electrical connectors for electrically connecting said case to a dock or cable for charging a battery in said case and/or for transferring data into or out of said case.

12. The watch case of claim 11, wherein the case comprises a flange that extends in a direction away from the display housing, said flange having the electrical connectors arranged thereon.

13. The watch case of claim 12, wherein the connectors are arranged at the end of the flange that is distal from the display housing.

14. The watch case of claim 1, wherein the watch case is combined with a strap for securing the watch to the arm or wrist of a user to form a fitness watch.

15. The watch of claim 14, wherein the strap comprises at least two apertures, and the display and input of the watch case each project through an aperture in the strap.

16. The watch of claim 14, wherein the strap and watch case are configured such that the strap is releasably engagable with the case in a manner such that the strap can be repeatedly engaged and disengaged from the case.

17. The watch of claim 14, wherein the watch strap comprises at least two apertures, the strap and/or apertures in the strap being configured so as to releasably engage with the fitness watch case, and wherein the display and input of the watch case each project through an aperture in the strap in use.

18. A system comprising:
a fitness watch case comprising:
a display housing that houses a display for displaying information to a user;
a user interface having an input for navigating through a menu displayed on the display to control the functioning of the watch; and
an antenna arranged to receive signals transmitted from navigation satellites,
wherein the user interface is spaced apart from the display housing, the display housing being physically connected to the user interface by a connecting portion, wherein the connecting portion is curved or angled along the direction from the display housing to the user interface such that when the display housing is arranged on the back of a user's wrist in use, the connecting portion curves or otherwise extends around the wrist such that the user interface is located on the side of the user's wrist,
wherein the antenna resides in a camber defined by the user interface; and wherein the watch case has a lower surface for contacting the user's wrist in use and an upper, opposite surface for facing away from the user's wrist in use, and wherein the input has a substantially planar surface arranged substantially parallel to and above a portion of the lower surface, the input being configured to be operated by being pressed in a direction that is substantially perpendicular to its substantially planar surface, in a direction from the upper surface towards the lower surface; and a docking system for charging or exchanging data with the watch case, wherein the docking system comprises docking electrical connectors for connecting with the electrical connectors on the watch case in order to supply electrical charge and/or data to the electrical connectors of the watch case and/or to receive data from the watch case.

19. The system of claim 18, wherein a dock of the docking system has a slot for receiving the flange of the watch case therein, and wherein the electrical connectors of the watch and the docking connectors are arranged and configured to engage with each other within the slot.

20. The system of claim 18, wherein the watch case has a lower surface for contacting the user's wrist in use and an upper, opposite surface for facing away from the user's wrist in use, and wherein the input has a substantially planar surface arranged substantially parallel to and above a portion of the lower surface, the input being configured to be operated by being pressed in a direction that is substantially perpendicular to its substantially planar surface, in a direction from the upper surface towards the lower surface.

* * * * *